Jan. 12, 1954

J. E. HENRY 2,665,481

METHOD OF AERIAL MAPPING

Filed March 2, 1951

INVENTOR.
JAMES E. HENRY
BY
ATTORNEYS

Jan. 12, 1954  J. E. HENRY  2,665,481
METHOD OF AERIAL MAPPING
Filed March 2, 1951  3 Sheets-Sheet 2

INVENTOR.
JAMES E. HENRY

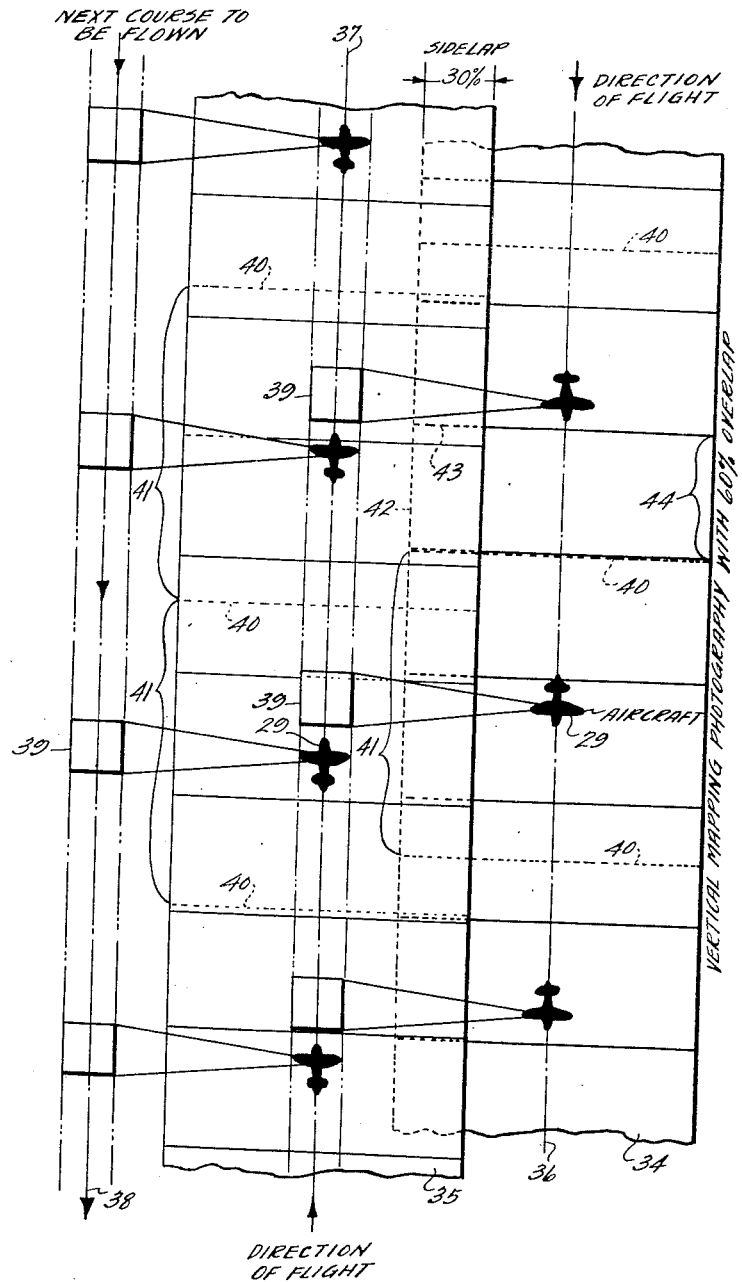

Patented Jan. 12, 1954

2,665,481

UNITED STATES PATENT OFFICE 2,665,481

METHOD OF AERIAL MAPPING

James E. Henry, Dayton, Ohio

Application March 2, 1951, Serial No. 213,660

5 Claims. (Cl. 33—1)

(Granted under Title 35, U. S. Code (1952), sec. 266)

The invention described herein may be manufactured and used by or for the Government for governmental purposes without payment to me of any royalty thereon.

This invention relates to a method of mapping terrain photographically from an aircraft. Heretofore it has been a considerable problem to fly a mapping course so that the pilot flying the adjacent course to make a strip map of the terrain adjacent to that covered in the first course would be able to interlock satisfactorily the second mapping strip with the first mapping strip. The first mapping strip was never instantaneously available as a guide for the second flight or subsequent flights. Development and printing of the various strips necessitated grounding of the airplane between each strip flown in order to obtain a check for side-lap purposes.

The recent invention of the instantaneous developing and printing camera by Edwin C. Land is the basis of the present improvement in aerial strip mapping. The Land camera, which is now well known, is based on Patents 2,435,717, 2,435,718 and 2,435,720. Briefly stated, the new method comprises flying a strip course while photographing a terrain directly underneath with a conventional mapping camera and at the same time photographing the terrain on one side of the strip with a second camera, a Land camera, the field of which extends into unknown territory. The photograph made by the second camera is used for navigating the aircraft along the next flight line. The navigation photography, which is at substantially a right angle to the strip being flown and mapped, is performed with one of the two Land cameras with which the aircraft is preferably provided. When the airplane reaches the end of the strip intended to be mapped it will execute a hairpin turn whereby it will then be in a position to fly the adjacent strip in the opposite direction. The time which is used in making the straight flight and to make the turn is employed by the photographer to develop the prints almost automatically one by one in the Land camera and from them to take prints one by one which bear a line indicating the course to be flown. This line is obtained by means of a wire stretched in the focal plane of the Land cameras so that the views taken by them are divided longitudinally into halves by the resulting line. While, of course, there is no line over the actual terrain which is to be flown on the second course, still the location of the imaginary line over the actual terrain can be inferred from the landmarks which the photographed line traverses. The short time necessary for the development of the Land print enables an airplane to map a large amount of previously unmapped terrain by flying a parallel grid course over it without the necessity of making any landings for the purposes of developing or matching film. The last print developed on the turn is the first one utilized by the pilot for determining the location of this next straight line of flight, and the remaining ones are consulted in the order which is the reverse of that in which they were made.

One object of the invention is therefore to map terrain without the necessity of having any preliminary large scale maps of the areas which have heretofore been necessary for plotting the flight lines to be flown and for navigating the flight lines while flying the mosaic.

Another object is to render it possible to map hostile territory of which no maps are available, without the many re-flights which have been heretofore required and which is expensive in both time, money and possibly life.

Another object is to provide a mapping method in which flight lines of any length may be flown and to obtain photography of the area in a checker-board or mosaic pattern with a standard amount of side-lap and overlap.

Another object is to provide a more rapid method of mapping than has heretofore been available, especially when the time requirement for putting the strip maps together is considered.

Another object is to provide a method, flying a map mosaic the base line of which need be only the location and direction of the first flight. If a plane drifts off course, i. e., out of parallelism with the first flight, this flight line can be recognized immediately as being out of parallelism and may be re-flown before flying the next flight line or strip.

Referring now to the drawings.

Figure 4:
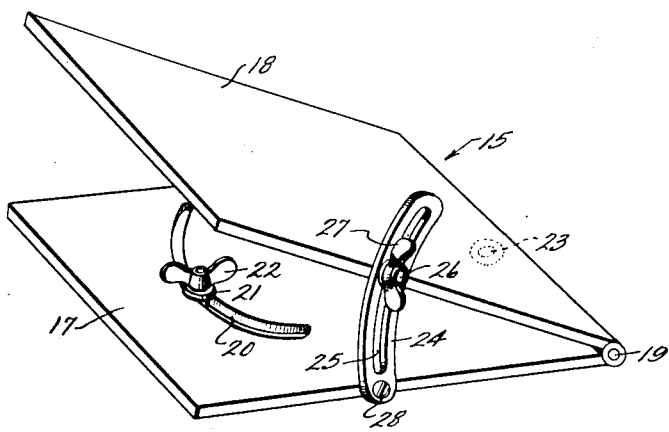

Fig. 4 is a perspective view of a simple type of camera mount which is used to determine adjustably the angular positions which are to be occupied by the Land cameras during the mapping flights. This mount per se is not regarded as invention; and Fig. 5 is a schematic showing the making of the finished map mosaic, the Land camera photographs being shown as small squares superposed on over-lapping and side-lapping squares which are the mapping camera prints.

Referring again to Fig. 1, 10 is the lower part of the airplane fuselage in which is mounted a conventional mapping camera 11 which projects through the bottom of the fuselage and may be directed vertically downward to the ground 12 along the vertical line 13a. The camera 11 may, according to the Example 1 which is now to be described, be able to photograph the terrain included within an angle of 72°, the origin of which is the focal plane of the camera 11.

Figure 1:
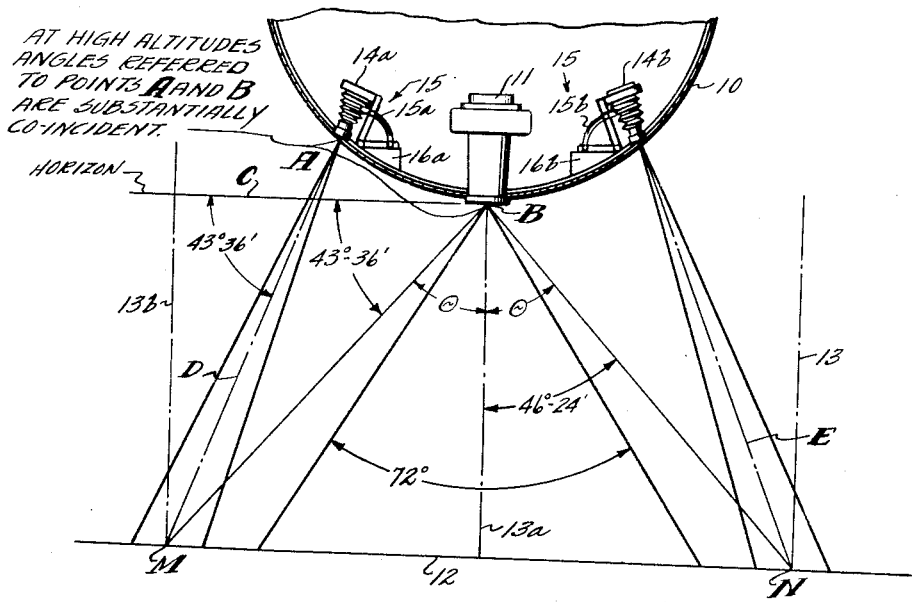
Fig. 1 is a diagram showing a fragment of a vertical cross-section of an airplane fuselage with cameras mounted therein, the angular relations between the terrain and the cameras being shown by lines directed to a base line which represents the ground.

Also mounted within the fuselage 10 are a pair of Land cameras 14a and 14b each attached to a mount which is shown in Fig. 4 and indicated generally by 15, the mounts in Fig. 1 being respectively 15a and 15b. The mounts rest upon blocks or supports which are designated in Fig. 1 respectively as 16a and 16b. These blocks have a top surface which is parallel to the longitudinal axis of the fuselage. When a standard 30% side-lap between strips is desired on the negatives which are to be furnished by the mapping camera, the cameras 14a and 14b are directed through windows or openings (not shown) in the fuselage at an angle which is 46° and 24' from the vertical as measured from the line 13a to the center of the adjoining flight line. If a different amount of side lapping is desired, photographers will know how to alter the angle accordingly on the Land navigation cameras. For 6" focal length mapping cameras of 9" x 9" format, the Land or navigation cameras 14a and 14b should be installed with a 43°-36' depression angle for 30% side-lap. The depression angle varies with the focal length, format sizes and percent side-lap so that a plus or minus 5° variation is permissible to accommodate various kinds of cameras.

It is possible to dispense with the wire which has been mentioned as being positioned across the focal plane of the Land camera, since a glass or "Plexiglas" plate with an etched centerline may be placed over the print after it is removed from the Land camera, or the print itself may be folded lengthwise to create a center line. However, it facilitates the operation if such a line be present. Since lines have previously been placed on negatives by means of wires to facilitate locations in aerial photography as for example, Patent No. 2,358,777, it has been deemed unnecessary to show the means of obtaining such a line on the negative.

The angle θ shown on Fig. 1 is not a camera angle, but is an angle which subtends the distance between successive flight strips. Line 13b indicates the center of the next flight strip. Line 13 indicates the center of the adjoining flight strip on the right. Line 13a therefore indicates the vertical line which bisects the flight strip being flown. Point M represents the junction of line 13b with the base line 12 and point N is the junction of line 13 with the base line.

Each Land camera 14a and 14b is directed respectively to the junction point M or N, whichever is on its appropriate side. It has been found that to intersect the points M and N, the Land cameras must be sighted at an angle 46°-24' from the vertical. The lines bounding the angles θ are 43°-36' from the horizontal line C which is substantially tangent to the fuselage of the airplane 10, assuming the fuselage to be semicircular. The angle between the line 13a and each boundary of the angle θ is 46°-24'. The lines D and E which bisect the field of view of the Land cameras 14a and 14b, respectively, must intersect the points M and N, respectively, with the maximum obtainable exactness. The lines D and E are represented on the photographs taken by the Land cameras by the lines produced by the wire spoken of previously as having been stretched longitudinally in the focal plane of these cameras.

Referring now to Fig. 4, the mount 15 comprises a baseboard 17 and an angular adjustable board 18 which are pivoted together at one edge of each board by a pivot 19. The baseboard 17 is provided with a semicircular slot 20 through which extends a bolt 21 which is anchored into one of the blocks 16a or 16b. The bolt 21 is provided with a wing nut 22 whereby a position of the board 17 can be fixed on the block 16a or 16b. An opening 23 is provided for a pivoting bolt (not shown) which extends upward from the block 16a or 16b near the fuselage wall. The mount is consequently able to pivot through an angle which may be governed by the length of the slot 20, which is a segment of the circle which would be generated in the board 20 by the bolt 21 upon rotation of the board, assuming that the board furnished no resistance to the bolt. Drift of the aircraft can be compensated for by altering the angular position of the mount about the pivot 23 and clamping it by the wing nut 22 into the appropriate position. Between the boards 17 and 18 there is an arcuate strut 24 in which there is a slot 25 through which projects a bolt 26, which bolt is attached to one edge of the board 18. The relative angular positions of the two boards may then be adjustably determined by locking the board 18 to the strut 24 by means of a wing nut 27 on the bolt 26 which extends through the slot 25. The strut is pivoted on the baseboard 17 by a pivot 28 which enters the edge thereof.

Figure 2:
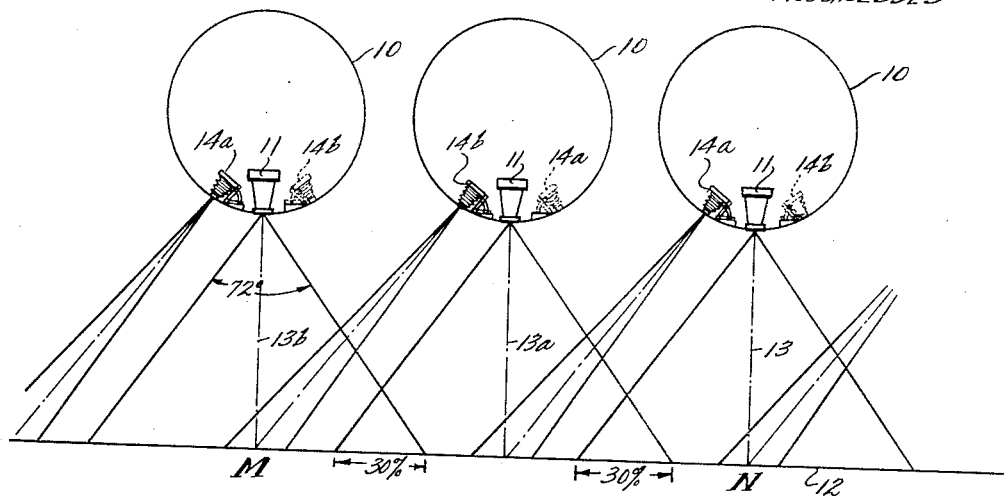
Fig. 2 is a view corresponding to Fig. 1 in which the relations between the photography in one strip or flight is correlated with the photography made by the same or different airplane when it is mapping adjacent strips.
Figure 3:
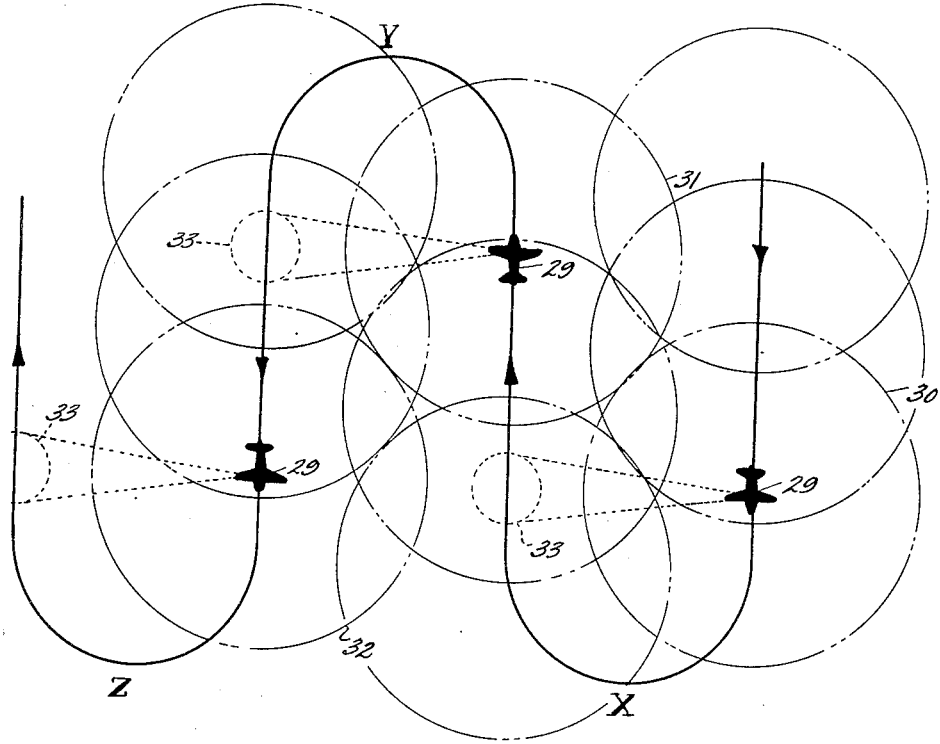
Fig. 3 is a plan view diagrammatically presented, of an airplane which is flying a series of parallel flight lines over terrain to be mapped, the dashed circles indicating the range of photographs which are made from the airplane at intervals according to the new method.

Referring now to Fig. 2, the three fuselage sections 10 represented in this figure are correlated with the positions of the airplane 29 represented in Fig. 3. At the right-hand side of Fig. 2 the airplane is coming toward the observer. In the middle of the three fuselages, the airplane is going away from the observer and on the left-hand side of the airplane is again approaching him.

The points N and M on Fig. 2 are the same as those appearing on Fig. 1 on the base line 12, likewise perpendicular lines 13, 13a and 13b are also those which intersect the base line 12 on Fig. 1. On the base line 12 in Fig. 2 the amount of side-lap, which has been standardized at 30% is indicated, this being the amount of side-lap of the view taken by the mapping camera 11 as a result of its 72° angular coverage. Obviously these angles can be modified without departing from the spirit of the invention.

In Fig. 2 will also be seen how the left-hand

Land camera in each case centers its field of view on the theoretical line which would extend back into the paper from the point where the lines 13, 13a and 13b join the base line 12. These imaginary lines, which are fully shown in Fig. 3 constitute the flight path to be followed by the airplane in making its series of parallel progressive courses from right to left. The turns are omitted in Fig. 2 but appear in Fig. 3. The pilot therefore, since he develops the Land camera views obtained while he is following one straight flight path, is in almost instantaneous possession of a picture of the next flight path that he must follow and which is available to him as a result of his developing the image while in flight indicated in Fig. 3.

While this method may be carried out by using a continuous strip camera such as the Sonne camera as the camera 11, in Fig. 3 the large dashed circles 30, 31 and 32 indicate exposures made in different flight strips or courses by an intermittent exposure mapping camera 11. Experience has demonstrated that most military aviation maps can be satisfactorily constructed by the use of exposures made when the airplane has reached the approximate positions in the flight path in which it is shown in Fig. 3. This figure also indicates that one Land camera is also operated at the same time that the mapping camera 11 exposes film. 33 indicates the areas photographed by the Land camera. The Land camera need be exposed about once in every ten miles of flight to make a satisfactory map. There is no set distance between the straight flight paths of the airplane, since such distance will vary according to the elevation flown, but the angular relations will remain generally the same. However, the higher the point from which the photographs are made, the greater the amount of terrain photographed at one time and the further apart the straight flight courses will be. The straight flight courses may be quite long, say one hundred miles or more.

In the interpretation of Figs. 1 and 2 it should be borne in mind that the aircraft actually flies at such a great height that it is practically a point source of observation. Angles referred to points A and B on this figure, when the airplane is at high altitudes, become substantially coincident. Therefore the Land cameras and the mapping camera 11 both take photographs from substantially the same point.

In Fig. 5, two strips or courses, 34 and 35 respectively, are being flown by an airplane 29. The center line of course 34, which the airplane 29 follows, is 36. The oppositely flown center line of course 35 is 37. The center line of the course which will next be flown is 38. The small squares 39 indicate views made by the Land cameras, some made from the right and some from the left side of the airplane.

In Fig. 5 the views 41 made by the mapping camera 11 extend from one full dotted horizontal line 40 to the other. The vertical dotted line 42 indicates the left boundary of the mapping camera views 41. It is apparent therefore that there is a side-lap between the strips 34 and 35 which is shown by dotted lines 43 and also indicated by legend at the top of the figure. The side-lap is 30% of the width of a photograph 41.

It is evident also that overlap, indicated by a bracket and 44 on strip 34, exists and is desired. The preferred amount is 60% of the length of the photograph 41.

Fig. 5 therefore gives schematically the order in which all of the photographs 41 are arranged for the purpose of mapping the terrain. While the use of an intermittent exposure mapping camera has been supposed the Sonne type of continuous exposure camera would be preferred. However, due to considerations of expense, the continuous exposure camera has not yet become the one commonly in use. While the Land camera photographs 39 are usually used for navigation purposes only, they may be used to supplement the larger views 41 if desired.

Various other cameras are the equivalents of the Land cameras. Certain of these operate on electrostatic principles, i. e. the Carlson process of "Xerography." One such equivalent camera is in use by the U. S. Army Signal Corps and is by it known unofficially as "Two Minute Minnie."

While only one Land camera is in use at one time, it is preferred to have two such cameras available, one on each side of the fuselage. The aircraft is then prepared to map in either left-to-right progression or right-to-left. Operation of both left and right cameras during a straight flight course, one photographing the center line of the next flight course and the other photographing the apparent middle line of the preceding flight course is of value. The photographs of the preceding flight course can be compared with the Land photographs of that course when it was still to be mapped with the mapping camera. If the two middle lines in both sets of Land photographs do not bear the same relation to known landmarks then the aircraft must have drifted off course.

What I claim is:

1. The method of aerial mapping of terrain from an aircraft which comprises flying parallel courses and turns connecting said courses, photographically recording the topography of the terrain directly beneath the aircraft and simultaneously recording the topography of the terrain at an oblique angle to a line drawn from the aircraft perpendicular to the earth's surface and substantially at a 45° angle in elevation from said perpendicular, developing the latent photographic image of the oblique view while said aircraft is in flight, establishing a well defined center line on the developed image parallel to the line of flight, flying said adjacent course along a line of the terrain represented substantially by the center line of the just-developed image and repeating the recording operation in relation to the previously unrecorded strip of terrain toward which the aircraft has advanced.

2. A method of aerial mapping of terrain from an aircraft comprising flying a course above an initial line of said terrain, simultaneously photographing the terrain successively along said course from a vertically stationed mapping camera in the aircraft and the terrain adjacent thereto in the direction of the terrain to be mapped from an obliquely directed sighting camera, developing the successive latent photographic images obtained from the sighting camera while proceeding on course, establishing a center line on the images so developed to provide a line of flight to follow as the aircraft completes the initial course, and turning the aircraft to follow the line of flight so determined and repeating the photographing proceeding along such succeeding line of flight.

3. A method of aerial mapping from a moving aircraft which is flying in a parallel grid pattern, the steps of which method comprising photographing simultaneously the terrain directly under the aircraft with a mapping camera and simultaneously the adjacent terrain to the side of the aircraft from an obliquely arranged sighting camera having a wire stretched in the focal plane thereof so as to divide the views taken thereby centrally thereof, developing the views obtained by the sighting camera while the aircraft is on the straight flight mapping course, with the sole exception of the last photograph, developing said last photograph obtained from the obliquely sighted camera while making the hairpin turn necessary to direct the aircraft to its succeeding flight mapping course, establishing the initial point on such succeeding course as determined by the line centrally of said last photograph, aligning the successively developed photographs taken in the straight flight mapping course by the sighting camera in reverse order, selecting the succeeding flight mapping course from the photographs so aligned, flying such course and repeating the photographing procedure in successive order.

4. The process of aerial mapping from an aircraft which is moving in a parallel grid pattern over the terrain to be mapped, which process comprises the steps of photographing the terrain directly under the aircraft with a conventional mapping camera and the terrain in the direction of the area to be mapped to the side of the aircraft successively with a Land type camera mounted substantially at a 45° angle to a vertical, developing the successive prints taken by the Land type camera substantially immediately, aligning the prints as they are developed while in flight, selecting the succeeding flight course from the aligned prints, executing a turn to direct the aircraft to follow such succeeding flight course, and repeating the photographing procedure along the so determined flight course.

5. The process of mapping terrain from a moving aircraft which contains a vertically mounted mapping camera and one or more Land cameras mounted at 90° to the longitudinal axis of the aircraft and substantially 45° from the perpendicular extending from the aircraft to the earth's surface, said process comprising photographing simultaneously with all cameras at predetermined uniform intervals obtaining views of substantially all the terrain traversed and oblique views of substantially all the terrain to be traversed in the next flight path, developing the oblique views in flight as they are obtained, aligning such views as they are obtained and establishing a center line thereon to serve as a flight path for the succeeding flight course, and turning the aircraft into the flight path so determined, repeating the photographing procedure, providing a substantially uniform side lap of the photographs taken by the mapping camera on succeeding flight courses.

JAMES E. HENRY.

References Cited in the file of this patent
FOREIGN PATENTS

| Number | Country | Date |
| --- | --- | --- |
| 441,235 | Great Britain | Jan. 15, 1936 |

OTHER REFERENCES

McKinley, "Applied Aerial Photography," Wiley-Sons, N. Y., 1929, pages 102–104. (Copy in Div. 7.)

McKinley, "Applied Aerial Photography," Wiley-Sons, N. Y., 1929, pp. 10–16. (Copy in Div. 7.)